UNITED STATES PATENT OFFICE.

ROBERT E. BRAND, OF CASPER, WYOMING, ASSIGNOR TO THE RESISTOCRETE COMPANY, OF CASPER, WYOMING, A CORPORATION OF WYOMING.

ARTIFICIAL STONE.

991,419.  Specification of Letters Patent.  Patented May 2, 1911.

No Drawing.   Application filed May 14, 1910.  Serial No. 561,358.

*To all whom it may concern:*

Be it known that I, ROBERT E. BRAND, a citizen of the United States, residing at Casper, in the county of Natrona and State of Wyoming, have invented certain new and useful Improvements in Artificial Stone; and I do declare the following to be a full, clear, and exact description of the invention, such as will enable others skilled in the art to which it appertains to make and use the same.

This invention relates to artificial stone and has for its object to provide a building material which is practically fire proof, being capable of withstanding great heat, and enormous strains, stresses or shocks.

With this object in view the invention consists in the novel composition of the artificial stone as will be first fully described and afterward specifically pointed out in the appended claims.

In forming the artificial stone in accordance with this invention I employ Portland cement, hornblende and carbon, mixed in proportions of about 2 parts by measure Portland cement, 2 parts hornblende and 1 part carbon such as coal-cinders, or coal refuse, although these proportions can be varied to meet conditions without departing from this invention. For instance where the material is to stand heavy stresses and shocks, such as on floors, sidewalks, retaining walls, etc., 1 part Portland cement, 2 parts hornblende and 1 part carbon is preferable, while for foundations for reciprocating machinery, bridges, etc., where resiliency is desired, 1 part Portland cement, 1 part hornblende and 2 parts carbon give better results. The composition is mixed together with water as is usual and left one day in the mold, then placed in water for one day and left eighteen days in the air. The hornblende is crushed and the carbon is crushed to about the size of granulated sugar before being mixed with the cement. The object of the carbon is for the purpose of adding resiliency to the stone and to prevent the same from being excessively heavy, while the purpose and object of the hornblende is to supply to the composition a material as fire proof as ordinary silica or sand, but which will not expand or contract so suddenly as sand and is less of a conductor of heat.

Having thus fully described the invention what I claim and desire to secure by Letters Patent of the United States is:—

1. An artificial stone including Portland cement, two parts; hornblende, two parts; and carbon, one part.

2. The described process of producing artificial stone, which consists in crushing hornblende to a suitable fineness, reducing the carbon to a granular state and mixing these and cement in water in the proportions stated, allowing the mixture to stand in a mold for a day, next placing the composition in water, it remaining therein for one day, and finally allowing the mixture to stand for eighteen days in the open air or atmosphere.

In testimony whereof, I affix my signature, in presence of two witnesses.

ROBERT E. BRAND.

Witnesses:
E. RICHARD SHIPP,
D. L. SHIPP.